United States Patent Office 3,578,653
Patented May 11, 1971

3,578,653
MONOAZONAPHTHOTRIAZOSTILBENE DYESTUFFS
William E. Wallace, R.D. 1, Box 190A,
Rensselaer, N.Y. 12144
No Drawing. Filed Dec. 18, 1967, Ser. No. 691,141
Int. Cl. C07c 7/06; C09b 43/00; D21h 1/46
U.S. Cl. 260—157     5 Claims

ABSTRACT OF THE DISCLOSURE

A monoazonaphthotriazolostilbene dyestuff, especially useful for dyeing paper, having in free acid form the formula

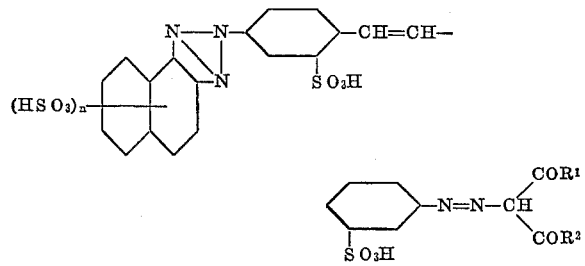

where $n$ has a value of 1 or 2, $R^1$ is alkyl or phenyl, $R^2$ is $R^1$, alkoxy or phenoxy, or $R^1$ and $R^2$ jointly represent —NHCONH—. Use of these dyes results in dyeings having bright, pure and strong reddish to greenish-yellow shades with good fastness properties.

---

This invention relates to novel monoazo dyestuffs and more particularly to such dyestuffs of the naphthotriazolo-stilbene type.

Dyestuffs of the above type are generally well known in the art, as for example disclosed in U.S. Pat. No. 3,186,980. The dyestuffs of this patent have generally the structural formula first depicted above but wherein the $R^2$ moiety is —NH-aryl. While these previously known types of dyestuffs have good affinity for cellulose fibers, particularly paper, produce greenish-yellow dyeings with good fastness properties, and are readily dischargeable with common bleaching agents, they are not too economical to produce, and the dyeings are not as strong, bright and/or greenish as could be desired. Other disadvantages may also have become apparent to users of such dyestuffs.

It is an object of this invention to provide a dyestuff which will not be subject to one or more of the above disadvantages. A further object of the invention is the provision of novel dyestuffs especially suitable for producing readily dischargeable paper dyeings having pure, bright and/or strong shades. Another object of the invention is the provision of such novel dyestuffs particularly advantageous for dyeing alum or rosin sized paper. A still further object of the invention is the provision of such novel dyestuffs which are relatively more economical to produce. Other objects and advantages will appear as the description proceeds.

The attainment of the above objects is made possible by the present invention according to which there is provided a dyestuff having the structural formula first depicted above. In the above formula, the alkyl and alkoxy values for $R^1$ and $R^2$ may be straight or branched and may contain any number of carbon atoms depending upon the desired properties of the dyestuffs, such as for example from 1 to about 18 carbon atoms, but lower alkyl and lower alkoxy moieties of from about 1 to 4 carbon atoms are preferred. The $R^1$ and $R^2$ moieties and the remaining aryl moieties in the dyestuffs of this invention may contain one or more nonchromophoric substituents such as alkyl, alkoxy, hydroxy, halogen, alkyl mercapto, carboxylic acid and its salts, esters, amides and nitriles, and sulfonic acid and its salts, esters, amides and sulfones.

The novel dyestuffs of this invention may be produced in conventional manner, as for example according to the procedure described in the above mentioned patent except for use of a diketone having the formula $R^1COCH_2COR^2$, wherein $R^1$ and $R^2$ have the values given above, in the final coupling reaction instead of an acylacetarylide. Thus, these dyestuffs can be produced by diazotizing an aminonaphthotriazolostilbene having the formula given above but wherein the righthand portion beginning with the azo bridge is replaced by $—NH_2$, and coupling the resulting diazonium salt with a diketone of the formula given above.

The said aminonaphthotriazolostilbenes are known compounds, and are generally prepared by diazotizing 4-amino-4'-nitro-2,2'-stilbene-disulfonic acid and coupling with an aminonaphthalene sulfonic acid which is capable of coupling in ortho position to the amino group, oxidizing to produce the triazine ring, and then reducing the nitro group to amino. The following are cited as typical examples of aminonaphthalene sulfonic acid compounds which may be used:

1-naphthylamine-4-sulfonic acid
2-naphthylamine-5-sulfonic acid
2-naphthylamine-6-sulfonic acid
2-naphthylamine-7-sulfonic acid
2-naphthylamine-3,6-disulfonic acid
2-naphthylamine-5,7-disulfonic acid
2-naphthylamine-6,8-disulfonic acid The following diketone compounds of the above formula which may be coupled in known manner with the diazonium salt of any of the above aminonaphthotriazo-stilbenes, for example as derived from 2-naphthylamine-3,6-disulfonic acid, are given as merely illustrative and not limitative.

2,4-pentanedione (acetylacetone)
2,4-hexanedione
2,4-heptanedione
6-methyl-2,4-heptanedione
3,5-octanedione
4-phenyl-2,4-butanedione (benzoylacetone)
5-phenoxy-3,5-pentanedione
6-phenoxy-4,6-hexanedione
5-phenyl-2-methyl-3,5-pentanedione
6-phenyl-2-methyl-4,6-hexanedione
5-phenyl-1,1-dimethyl-3,5-pentanedione
1-hydroxy-2,4-pentanedione
1-hydroxy-5-methyl-2,4-heptanedione
1-hydroxy-5,5-dimethyl-2,4-hexanedione
1,1-dichloro-2,4-pentanedione
1,5-dibromo-2,4-pentanedione
4-methoxy-2,4-pentanedione
1-ethoxy-2,4-pentanedione
4-octyloxy-2,4-pentanedione
1-dodecylmercapto-2,4-pentanedione
1-methoxy-2,4-hexanedione
1-phenoxy-2,4-pentanedione
4-heptadecyl-2,4-butanedione
5-tetradecyloxy-2,4-pentanedione
1,3-dihexadecyl-1,3-propanedione
1,3-diphenyl-1,3-propanedione
barbituric acid In the preparation of the dyestuffs of the present invention a preferred method is to couple approximately equivalent amounts of diazotized 4-amino-4'-nitro-2,2'-stilbenedisulfonic acid with an aminonaphthalenesulfonic acid in a weakly acid medium. The reaction medium is heated to about 70° C. and is then made Brilliant Yellow alkaline with an alkali, e.g. soda ash. The resulting aminoazo product is isolated by salting out and then filtering.

The isolated aminoazo compound is slurried in hot water to which is then added an ammoniacal solution of a copper salt. The mixture is maintained at the reflux for about 24 hours, filtered to remove the insoluble material and then salted and allowed to cool.

The resulting filtered naphthotriazine product is dissolved in warm, dilute mineral acid and the nitro group is reduced to the amine in usual manner, e.g. by addition of iron, zinc or similar metals. The resulting aminostilbenetriazine product is isolated by neutralizing the reaction mixture, salting out and filtering.

The isolated product is slurried in water and diazotized in usual manner. The diazonium solution is then coupled in strongly alkaline medium to a diketone having the formula given above. When the coupling is completed, which is quite rapid, the product is salted out and isolated in usual manner.

The resulting dyestuff, when in the form of its sodium salt, can be converted to the free acid form by dissolving the salt in water and making the solution distinctly acid. The mass yields the free acid form on evaporation to dryness. Similarly, the sodium salt can be converted to other metal (including alkali metal and alkaline earth metal), ammonia or organic amine salts such as with potassium, calcium, magnesium, aluminum, chromium, or organic amines of aliphatic, aromatic or heterocyclic types such as mono-, di-, and tri-ethanol-, -ethyl-, -octyl-amines, pyridine, morpholine, piperidine, piperazine, guanidine, and the like. The conversion could be carried out by acidifying an aqueous solution of the sodium salt and treating this solution with at least a stoichiometric amount of water soluble salt of the desired metal, organic amine or ammonia. This salt could be isolated by cooling to precipitate if it is relatively insoluble or by evaporating to dryness. The alkali metal and ammonium salts are preferred.

The dyestuffs of this invention are generally light yellow powders, and the preferred lower molecular weight forms are water soluble. Although they may be employed for coloring any natural or synthetic material in any form, they are especially advantageous when used to dye cellulosic fibers. These dyes are particularly suitable for the dyeing of paper. Especially when alum or rosin sized paper is colored with these dyes, the dyeings have particularly bright, pure and strong reddish-to greenish-yellow shades. Since these dyes are completely dischargeable by known bleaching agents, papers dyed therewith can be completely discolored so that they can be reused either alone or with other wastes for making white or colored papers.

The following examples are only illustrative of preferred embodiments of this invention and are not to be regarded as limitative. All parts are by weight unless otherwise indicated.

EXAMPLE 1

44.4 parts of 4-amino-4'-nitro-2,2'-stilbenedisulfonic acid, disodium salt, is diazotized in usual manner and coupled in a weakly acidic medium with 30.3 parts 2-aminonaphthalene-3,6-disulfonic acid.

The mixture is agitated until the coupling is completed, then heated to 70° C., and made Brilliant Yellow alkaline by addition of soda ash. The reaction mass is salted and cooled to produce a precipitate which is then filtered.

The filter cake is slurried in 100 parts water and then heated to solution at 90° C. To this hot solution is added a solution of 50 parts copper sulfate pentahydrate, 66.5 parts ammonium hydroxide 28% and 200 parts water. The resulting mass is heated to and held at the reflux for 24 hours. The mass is then filtered, and the filtrate salted, cooled and filtered again.

The filter cake, which consists of 4-(3,6-disulfonaphthotriazin - 2 - yl)-4'-nitro-2,2'-stilbenedisulfonic acid, is reslurried in 1500 parts water to which 34.8 parts hydrochloric acid 20° Bé. is then added. The mixture is heated to about 100° C., and 40 parts iron borings 60 mesh added as rapidly as convenient. The reduction mixture is heated below the boil for about 2 hours, then made Brilliant Yellow alkaline by addition of soda ash, and filtered. The filtrate is salted, cooled and filtered.

The filter cake, which consists of 4'-amino-4-(3,6-disulfonaphthotriazin-2-yl)-2,2'-stilbenedisulfonic acid, is reslurried in 500 parts water. 29 parts hydrochloric acid 20° Bé. are added and the mixture iced to 10° C. Sodium nitrite solution (31.5% $NaNO_2$) is added slowly until a test for nitrite indicates no free nitrous acid. The resultant diazonium salt solution is added to a mixture of 11 parts 2,4-pentanedione, 30 parts soda ash and 300 parts water cooled to 5° C. The reaction mass is agitated for 24 hours without further temperature control. The dyestuff precipitates, and is filtered and dried.

The product is the sodium salt of the dyestuff having the formula first given above wherein $n$ is 2, the —$SO_3H$ groups are in 3,6-positions in the naphthyl ring, and $R^1$ and $R^2$ are each $CH_3$. It is a yellow powder which dyes rosin and alum sized cellulosic fiber in bright greenish-yellow shades which fluoresce strongly when exposed to ultraviolet light. It is readily converted to its free acid form by dissolving in water, acidifying, and evaporating to dryness.

EXAMPLE 2

In a manner analogous to that described above 60.2 parts 4'-amino-4-(4-sulfonaphthotriazin-2,yl) - 2,2' - stilbenedisulfonic acid is diazotized and coupled with 11 parts 2,4-pentanedione.

The resulting product is the sodium salt of the dyestuff of the formula first given above wherein $n$ is 1, the —$SO_3H$ group is in the 4-position in the naphthyl ring, and $R^1$ and $R^2$ are each $CH_3$. It is a yellow powder, soluble in water and dyes alum and rosin sized cellulosic fiber in a bright greenish-yellow shade which fluoresces intensely on exposure to ultraviolet light.

EXAMPLE 3

According to the manner of Example 1, 68.2 parts 4'-amino-4-(3,6 - disulfonaphthotriazin-2-yl)-2,2'-stilbenedisulfonic acid are diazotized and coupled with 14 parts barbituric acid. The dyestuff is a yellow powder, soluble in water which dyes alum and rosin sized cellulosic fibers in a bright yellow color. The dyestuff has the formula of that of Example 1 except that $R^1$ and $R^2$ jointly represent —NHCONH—.

EXAMPLE 4

According to the manner of Example 1, 60.2 parts 4'-amino - 4 - (4 - sulfonaphthotriazin-2-yl)-2,2'-stilbenedisulfonic acid are diazotized and coupled with 15 parts ethyl acetoacetate. The resulting yellow powder is soluble in water and colors alum and rosin sized cellulose fibers in a bright yellow color. The dyestuff has the formula of that of Example 2 except that $R^2$ is ethoxy.

EXAMPLE 5

As in Example 1, 68.2 parts 4'-amino-4-(3,6-disulfonaphthotriazin-2-yl) - 2,2' - stilbenedisulfonic acid are diazotized and coupled with 16.5 parts 1-phenyl-1,3-butanedione. A yellow water-soluble powder is obtained which dyes alum and rosin sized cellulosic fiber a reddish-yellow shade. It has the formula of that of Example 1 except that $R^1$ is phenyl.

EXAMPLE 6

As in Example 1, 68.2 parts 4'-amino-4-(5,7-disulfonaphthotriazin-2-yl) - 2,2' - stilbenedisulfonic acid are diazotized and coupled with 2,4-pentanedione. The yellow, water-soluble dyestuff dyes alum and rosin sized cellulosic fiber in a yellow shade.

The product is the sodium salt of the dyestuff of the formula first given above wherein $n$ is 2, the $-SO_3H$ groups are in 5,7-positions in the naphthyl ring, and $R^1$ and $R^2$ are each $CH_3$.

This invention has been disclosed with respect to certain preferred embodiments, and it will be understood that various modifications and variations thereof obvious to workers of ordinary skill in the art are to be included within the spirit and purview of this application and the scope of the appended claims.

I claim:

1. A monoazo dyestuff having in free acid form the formula

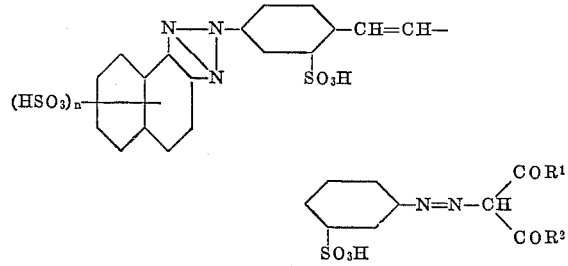

wherein $n$ has a value of 1 or 2, $R^1$ and $R^2$ are $C_{1-18}$ alkyl.

2. A dyestuff as defined in claim 1 wherein $n$ has a value of 2.

3. A dyestuff as defined in claim 2 wherein $R^1$ and $R^2$ are each methyl.

4. A dyestuff as defined in claim 1 wherein $n$ has a value of 1.

5. A dyestuff as defined in claim 4 wherein $R^1$ and $R^2$ are each methyl.

References Cited

UNITED STATES PATENTS

| | | | |
|---|---|---|---|
| 2,795,578 | 6/1957 | Feeman | 260—157X |
| 2,799,671 | 7/1957 | Gunst | 260—157X |
| 3,084,152 | 4/1963 | Andrew | 260—160X |
| 3,117,958 | 1/1964 | Storn et al. | 260—157X |
| 3,186,980 | 6/1965 | Litke | 260—157 |

FLOYD D. HIGEL, Primary Examiner

U.S. Cl. X.R.

8—7, 41; 117—144, 154; 260—152, 154, 156, 196, 249.5, 592, 594

PO-1050
(5/69)

UNITED STATES PATENT OFFICE
CERTIFICATE OF CORRECTION

Patent No. 3,578,653     Dated May 11, 1971

Inventor(s) WILLIAM E. WALLACE

It is certified that error appears in the above-identified patent and that said Letters Patent are hereby corrected as shown below:

Column 1, line 5, the term -- , Assignor to GAF Corporation, New York, N.Y., a Corporation of Delaware -- should appear after "12144."

Signed and sealed this 12th day of October, 1971.

(SEAL)
Attest:

EDWARD M. FLETCHER, JR.
Attesting Officer

ROBERT GOTTSCHALK
Acting Commissioner of Patents